United States Patent
Wessel et al.

(10) Patent No.: US 10,410,669 B1
(45) Date of Patent: *Sep. 10, 2019

(54) BOLOMETER WITH TEMPERATURE COMPENSATION FOR INTERNAL LASER POWER MONITORING IN HEAT-ASSISTED MAGNETIC RECORDING DEVICE

(71) Applicant: Seagate Technology LLC, Cupertino, CA (US)

(72) Inventors: James Gary Wessel, Savage, MN (US); Jon Karsten Klarqvist, Roseville, MN (US); John Charles Duda, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/170,462

(22) Filed: Oct. 25, 2018

Related U.S. Application Data

(63) Continuation of application No. 15/342,339, filed on Nov. 3, 2016, now Pat. No. 10,127,940.

(60) Provisional application No. 62/252,009, filed on Nov. 6, 2015.

(51) Int. Cl.
| | | |
|---|---|---|
| *G01J 1/42* | (2006.01) | |
| *G01J 5/22* | (2006.01) | |
| *G11B 7/13* | (2012.01) | |
| *G11B 5/48* | (2006.01) | |
| *G11B 5/00* | (2006.01) | |

(52) U.S. Cl.
CPC .............. *G11B 7/13* (2013.01); *G01J 1/4257* (2013.01); *G01J 5/22* (2013.01); *G11B 5/4853* (2013.01); *G11B 5/4866* (2013.01); *G11B 2005/0021* (2013.01)

(58) Field of Classification Search
CPC ........... G01J 1/457; G01J 5/22; G11B 5/4866; G11B 5/4853; G11B 5/314; G11B 7/13
See application file for complete search history.

(56) References Cited

U.S. PATENT DOCUMENTS

| | | |
|---|---|---|
| 6,611,487 B2 | 8/2003 | Shimano et al. |
| 6,671,248 B2 | 12/2003 | Miyabata et al. |
| 6,944,112 B2 | 9/2005 | Challener |
| 7,057,999 B2 | 6/2006 | Cheong et al. |
| 7,077,564 B2 | 7/2006 | Schloss et al. |
| 7,589,928 B2 | 9/2009 | Roy et al. |

(Continued)

*Primary Examiner* — David P Porta
*Assistant Examiner* — Djura Malevic
(74) *Attorney, Agent, or Firm* — Hollingsworth Davis, LLC

(57) ABSTRACT

A slider configured for heat-assisted magnetic recording comprises an optical sensor coupled to first and second bond pads. The optical sensor comprises a bolometer and a reference sensor. The bolometer is situated at a location of the slider that receives at least some of the light and exposed to an ambient temperature at the slider. The bolometer produces a signal in response to a change in the ambient temperature and the change in output optical power. The reference sensor is situated at a location of the slider unexposed to the light and exposed to the ambient temperature. The reference sensor is coupled to the bolometer and configured to produce a signal in response to the change in the ambient temperature. The optical sensor is configured to generate a sensor signal indicative of changes in output optical power of a laser source without contribution due to ambient temperature changes.

20 Claims, 11 Drawing Sheets

(56) References Cited

U.S. PATENT DOCUMENTS

| | | |
|---|---|---|
| 8,391,107 B2 | 3/2013 | Gage et al. |
| 8,451,696 B2 | 5/2013 | Huang et al. |
| 8,705,323 B2 | 4/2014 | Contreras et al. |
| 8,842,507 B1 | 9/2014 | Hirano et al. |
| 9,030,773 B2 | 5/2015 | Macken et al. |
| 9,202,488 B2 | 12/2015 | Peng et al. |
| 9,202,499 B2 | 12/2015 | Kiely et al. |
| 9,536,555 B1 | 1/2017 | Duda et al. |
| 9,558,774 B1 | 1/2017 | Macken |
| 9,607,640 B2 | 3/2017 | Macken et al. |
| 9,679,597 B1 | 6/2017 | Zhu et al. |
| 9,691,424 B2 | 6/2017 | Duda et al. |
| 9,799,361 B1 | 10/2017 | Duda et al. |
| 9,824,705 B1 | 11/2017 | Macken et al. |
| 9,870,787 B1 | 1/2018 | Wessel et al. |
| 9,875,767 B2 | 1/2018 | Duda et al. |
| 9,905,254 B1 | 2/2018 | Ramakrishnan et al. |
| 9,905,255 B1 | 2/2018 | Ramakrishnan et al. |
| 9,972,350 B1 | 5/2018 | Macken et al. |
| 9,990,947 B1 | 6/2018 | Macken et al. |
| 2001/0030928 A1 | 10/2001 | Cheong et al. |
| 2006/0221483 A1 | 10/2006 | Kamimura et al. |
| 2007/0159718 A1 | 7/2007 | Kim et al. |
| 2008/0204916 A1 | 8/2008 | Matsumoto et al. |
| 2009/0040645 A1 | 2/2009 | Shimazawa et al. |
| 2009/0225464 A1 | 9/2009 | Juang et al. |
| 2009/0262460 A1 | 10/2009 | Hanchi |
| 2009/0310459 A1 | 12/2009 | Gage et al. |
| 2011/0122737 A1 | 5/2011 | Shimazawa et al. |
| 2011/0228651 A1 | 9/2011 | Gage et al. |
| 2011/0228653 A1 | 9/2011 | Shimazawa et al. |
| 2011/0299367 A1 | 12/2011 | Naniwa et al. |
| 2012/0008470 A1 | 1/2012 | Shimazawa et al. |
| 2012/0051196 A1 | 3/2012 | Grobis et al. |
| 2012/0120522 A1 | 5/2012 | Johnson et al. |
| 2013/0155538 A1 | 6/2013 | Contreras |
| 2013/0188273 A1 | 7/2013 | Miyamoto et al. |
| 2013/0286802 A1 | 10/2013 | Kiely |
| 2014/0119164 A1 | 5/2014 | Wilson et al. |
| 2014/0269238 A1 | 9/2014 | Kautzky et al. |
| 2015/0085630 A1 | 3/2015 | Macken et al. |
| 2015/0109892 A1 | 4/2015 | Contreras et al. |
| 2015/0194172 A1 | 7/2015 | Peng et al. |
| 2015/0279430 A1 | 10/2015 | Trantham et al. |
| 2015/0332725 A1 | 11/2015 | Rausch et al. |
| 2016/0284372 A1 | 9/2016 | Duda et al. |
| 2017/0032810 A1 | 2/2017 | Macken et al. |
| 2017/0263282 A1 | 9/2017 | Duda et al. |

BOLOMETER WITH TEMPERATURE COMPENSATION FOR INTERNAL LASER POWER MONITORING IN HEAT-ASSISTED MAGNETIC RECORDING DEVICE

RELATED PATENT DOCUMENTS

This application is a continuation of U.S. patent application Ser. No. 15/342,339, filed Nov. 3, 2016, which claims the benefit of Provisional Patent Application Ser. No. 62/252,009 filed on Nov. 6, 2015, and which are incorporated herein by reference in their entireties.

SUMMARY

Embodiments are directed to an apparatus comprising a slider having a plurality of electrical bond pads including a first bond pad and a second bond pad. A writer and a reader are provided on the slider. An optical waveguide is formed in the slider and configured to receive light from a laser source. A near-field transducer (NFT) is provided on the slider and optically coupled to the waveguide. An optical sensor is coupled only to the first and second bond pads and configured to generate a sensor signal indicative of changes in output optical power of the laser source. The optical sensor comprises a bolometer and a reference sensor. The bolometer is situated at a location of the slider that receives at least some of the light and exposed to an ambient temperature at the slider. The bolometer is configured to produce a signal in response to a change in the ambient temperature and a change in the output optical power. The reference sensor is situated at a location of the slider unexposed to the light and exposed to the ambient temperature. The reference sensor is coupled to the bolometer and configured to produce a signal in response to the change in the ambient temperature.

Embodiments are directed to an apparatus comprising a slider having a plurality of electrical bond pads including a first bond pad, a second bond pad, and a return bond pad. A writer and a reader are provided on the slider. An optical waveguide is formed in the slider and configured to receive light from a laser source. An NFT is provided on the slider and optically coupled to the waveguide. An optical sensor is coupled to the first and second bond pads and configured to generate a sensor signal indicative of changes in output optical power of the laser source. The optical sensor comprises a bolometer and a reference sensor. The bolometer is situated at a location of the slider that receives at least some of the light and exposed to an ambient temperature at the slider. The bolometer is configured to produce a signal in response to a change in the ambient temperature and a change in the output optical power. The reference sensor is situated at a location of the slider unexposed to the light and exposed to the ambient temperature. The reference sensor is coupled in series or parallel with the bolometer and configured to produce a signal in response to the change in the ambient temperature. A conductor is coupled to the return bond pad and a connection between the bolometer and the reference sensor.

Embodiments are directed to a method comprising transmitting light from a laser source through an optical waveguide of a slider. The method also comprises producing a first signal in response to sensing changes in an ambient temperature at the slider and changes in optical output power of the laser source using a bolometer exposed to the light. The method further comprises producing a second signal in response to sensing changes in the ambient temperature using a reference sensor at a slider location proximate the bolometer but unexposed to the light. The method also comprises combining the first and second signals to produce an output signal, the output signal indicative of changes in optical output power of the laser source without contribution due the ambient temperature changes.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
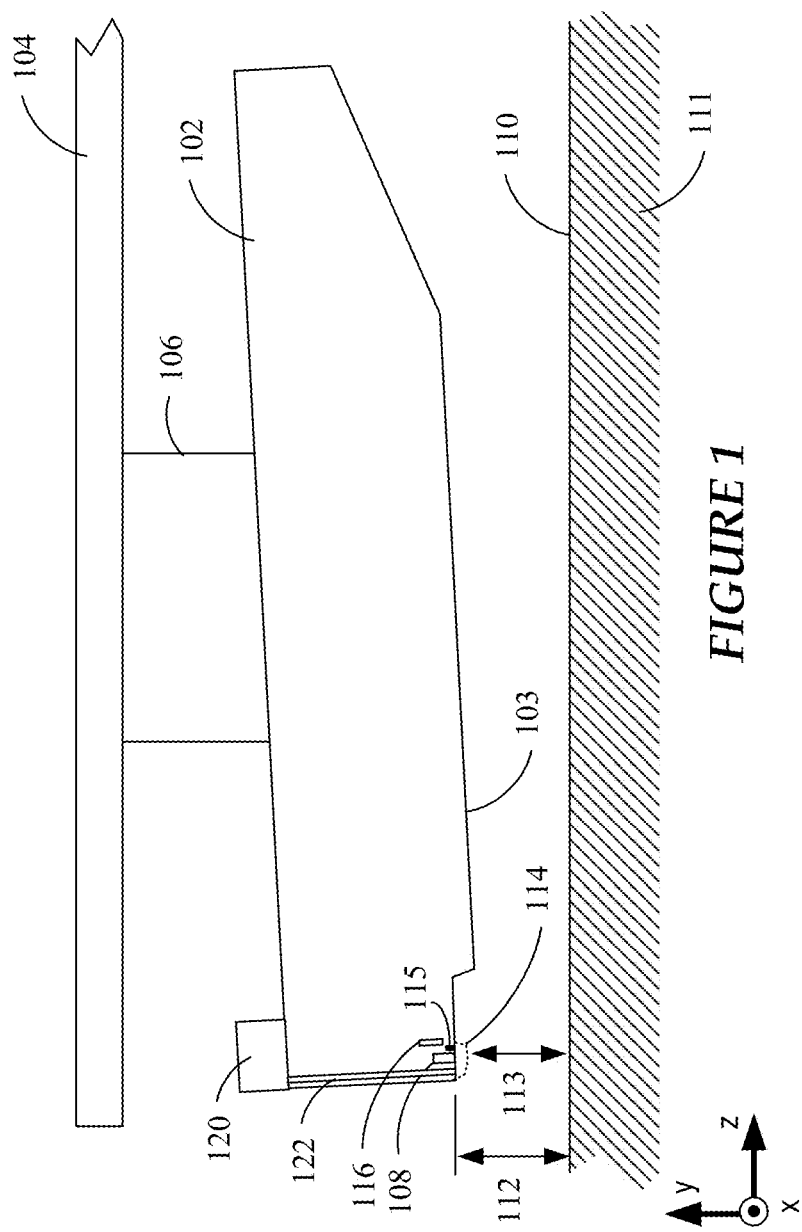
FIG. 1 is a cross-sectional view of a slider in which the various embodiments disclosed herein may be implemented.

The present disclosure generally relates to laser power monitoring in data storage devices that employ heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

A HAMR drive generally uses a laser diode to heat the recording medium to aid in the recording process. The laser diode generates heat and is also heated by other components (writer, reader, heater elements) in the magnetic slider. During write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. Large transition shifts in a block of data may not be recoverable by channel decoding, resulting in error bits.

Monitoring of laser power is important to ensure proper operation of the laser diode and to avoid instabilities such as mode hopping. Conventional laser power monitoring involves use of an external photodiode situated on a submount that also supports the laser diode. The photodiode senses optical power output of the laser diode, and can be used to determine if the laser performance is sufficiently stable to ensure adequate writing performance. However, future integrated HAMR recording transducers will not be able to include an external photodiode due to reduced submount dimensions. For HAMR hard drives, it is critical to detect small fluctuations in laser output optical power delivered to the NFT, which requires highly accurate optical or temperature sensing. Typically, an electrical element such as an internal laser power monitor (e.g., photodiode) would require extra, dedicated electrical bond pads to provide highly accurate optical or temperature sensing. Since additional bond pads add cost and complexity to the head gimbal assembly, it is desirable to provide for sensing of laser output optical power without the need for such extra electrical bond pads.

Embodiments of the disclosure are directed to a sensor arrangement internal to the slider that can be used to facilitate monitoring of output optical power of the laser diode. Embodiments of the disclosure are directed to a sensor that monitors output optical power of the laser diode with an improved signal-to-noise ratio by compensating for thermal background conditions that can otherwise confound temperature measurements made by the sensor. Embodiments are directed to a bolometric sensor that includes at least two electrical components that share electrical bond pads of the slider, thereby obviating the need for additional bond pads to operate the sensor. Embodiments are directed to a bolometric sensor that includes at least two electrical components that share electrical bond pads with at least one other electrical component of the slider, such as a reader or contact sensor, thereby obviating the need for additional bond pads to operate the bolometric sensor.

According to various embodiments, a bolometer can be situated adjacent the core of an optical waveguide formed in the slider so that light produced by the laser diode impinges on or is harvested by the bolometer. A reference sensor, such as a resistor, can be situated proximate the bolometric sensor but away from the light path of slider, such that the bolometer and reference sensor are on the same isotherm. In other words, the reference sensor is situated close to the bolometer so that both components are exposed to substantially the same thermal background (e.g., same ambient temperature), but outside of the light path so that no light impinges on the reference sensor. Circuitry that includes the bolometer and the reference sensor is configured to effectively subtract off signal content of the bolometer representative of the thermal background experienced by the bolometer and the reference sensor. Having subtracted off the non-optical thermal component of the bolometer signal, the remaining component of the bolometer signal represents the temperature and temperature variations due predominately (e.g., solely) to output optical power and power fluctuations of the laser diode.

The bolometer can be situated in or near the optical light path of the slider so that it absorbs or harvests light communicated along the waveguide, while minimally or negligibly impacting light transmission (e.g., minimal or negligible effect on waveguide efficiency and/or the mode profile along the light delivery path). For example, the bolometer can be situated within the internal body of the slider proximate the core of the waveguide, such as within the cladding of the waveguide. In various embodiments, the bolometer comprises a thin metallic element, such as a wire, with a high thermal coefficient of resistance (TCR). The reference sensor can be a thin metallic element, such as a wire, with a high TCR or other type of resistance sensing apparatus. In some embodiments, the bolometer and reference sensor are substantially the same or similar in terms of composition and geometry. For example, the bolometer and reference sensor can have substantially the same geometry (e.g., size and shape) and substantially the same TCR.

In some embodiments, the TCRs of the bolometer and reference sensor have the same sign (e.g., both positive or both negative). In other embodiments, the TCRs of the bolometer and reference sensor have different signs (e.g., one positive, the other negative). According to some embodiments, the circuitry that includes the bolometer and reference sensor is coupled only to two electrical bond pads each serving as a bias source. In other embodiments, the circuitry that includes the bolometer and reference sensor is coupled only to two electrical bond pads each serving as a bias source and one return bond pad (e.g., a bond pad tied to ground, and not a bias source).

When a small bias current is applied across the bolometer, any change in bolometer temperature will create a corresponding change in measured voltage. This change in bolometer temperature results from changes in output optical power of the laser diode and from changes in ambient temperature. At the same time, any changes in ambient temperature are also sensed by the reference sensor. The common ambient temperature component of the bolometer signal is subtracted off, leaving only the temperature and temperature changes due to output optical power of the laser diode. As a result, the bolometer can be used to monitor fluctuations in laser output optical power that cause fluctuations in absorption and temperature in the bolometric sensor with high fidelity. In general, a bolometer-based internal power monitor according to embodiments of the disclosure does not appreciably decrease light path efficiency yet still absorbs enough light to create a sufficiently large signal for detection. Moreover, embodiments of a bolometric sensor arrangement do not require any additional bond pads for temperature compensation, and can also be wired in series or parallel with an existing electrical component of the slider.

FIG. 1 shows a side view of a slider 102 configured for heat-assisted magnetic recording in accordance with a representative embodiment. The slider 102 may be used in a magnetic data storage device, e.g., a hard disk drive. The slider 102 may also be referred to herein as a recording head, read/write transducer, etc. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. The slider 102 further supports a laser 120 and incorporates an optical waveguide 122. The waveguide 122 delivers light from the laser 120 to components (e.g., a near-field transducer) near the read/write transducers 108.

When the slider 102 is located over surface 110 of recording medium 111, a flying height 112 is maintained between the slider 102 and the surface 110 by a downward force of arm 104. This downward force is counterbalanced by an air cushion that exists between the surface 110 and an air bearing surface 103 (also referred to herein as a "media-facing surface") of the slider 102 when the recording medium 111 is rotating. It is desirable to maintain a predetermined slider flying height 112 over a range of disk rotational speeds during both reading and writing operations to ensure consistent performance. Region 114 is a "close point" of the slider 102, which is generally understood to be the closest spacing between the read/write transducers 108 and the magnetic recording medium 111, and generally defines the head-to-medium spacing 113.

To account for both static and dynamic variations that may affect slider flying height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116. A thermal sensor 115 is shown situated at or near the close point 114 (e.g., adjacent the read/write transducers 108, such as near the near-field transducer) or can be positioned at other locations of the ABS 103.

Figure 2:
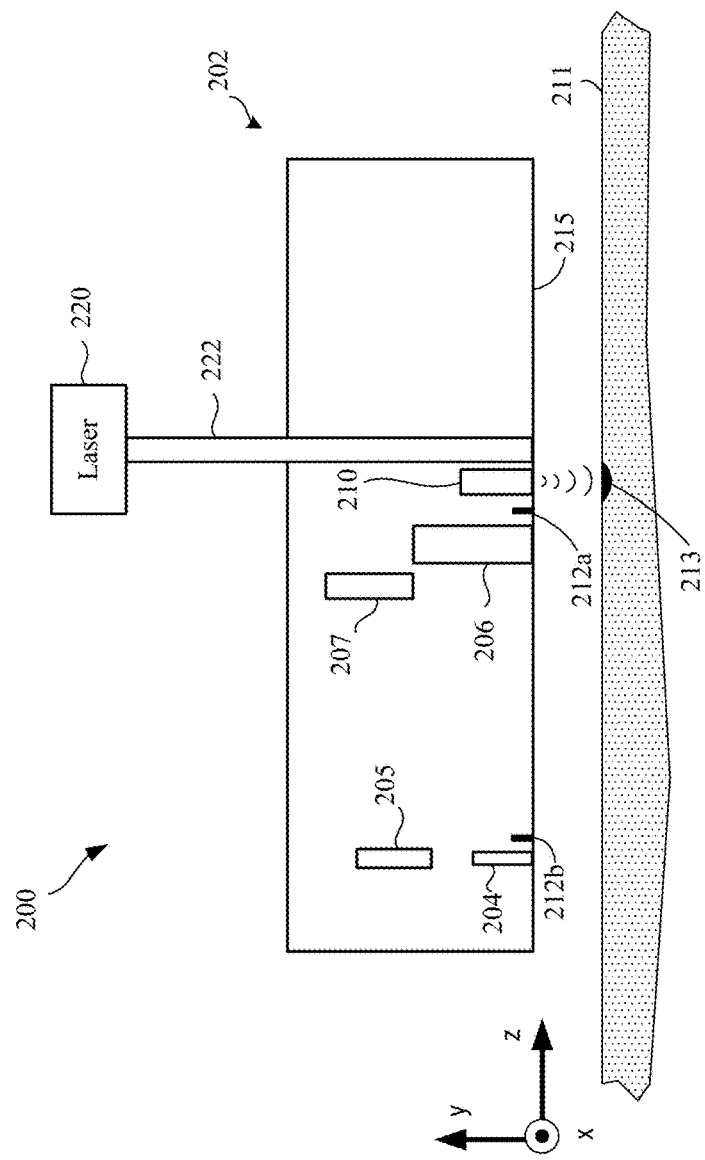
FIG. 2 is a cross-sectional view of a slider in which the various embodiments disclosed herein may be implemented.

FIG. 2 shows a HAMR head arrangement 200 in accordance with various embodiments. The HAMR head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent a near-field transducer (NFT) 210 which is optically coupled to a light source 220 (e.g., laser diode) via a waveguide 222. The light source 220 can be mounted external, or integral, to the slider 202. The light source 220 energizes the NFT 210 via the waveguide 222. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211. One or more thermal sensors 212a, 212b can be situated at various locations on the slider 202 at or near the ABS 215 for purposes of monitoring temperature, head-medium spacing changes, and head-medium contact.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 213 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider. As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 213 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hot spot on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hot spot 213. At resonance, a high electric field surrounds the NFT 210 due to the collective oscillations of electrons at the metal surface (e.g., substrate) of the magnetic medium 211. At least a portion of the electric field surrounding the NFT 210 tunnels into, and gets absorbed by, the magnetic medium 211, thereby raising the temperature of the spot 213 on the medium 211 as data is being recorded.

Figure 3A:
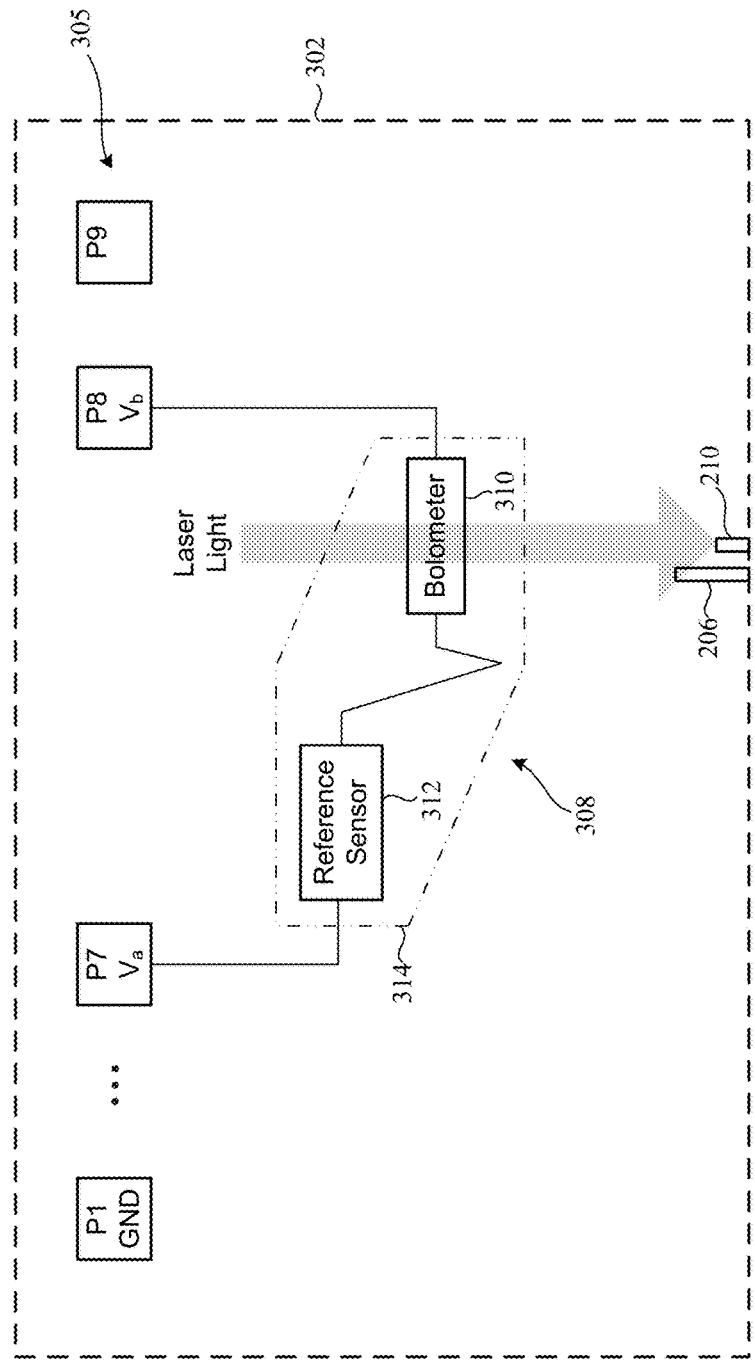
FIG. 3A is a diagram of an optical sensor configured for implementation on a slider in accordance with some embodiments.

Turning now to FIG. 3A, there is illustrated an optical sensor configured for implementation on a slider in accordance with various embodiments. The slider 302 shown in FIG. 3A supports a multiplicity of electrical components coupled to a set 305 of bond pads (P1-P9). The set 305 of bond pads includes eight electrical bond pads (P2-P9) and one ground pad (P9), also referred to as a shared return path. The term "electrical bond pad" refers to a bond pad that is coupled to a detector or a bias source, such as a voltage or current source (AC or DC) that provides power for an electrical component or components. It is noted that the polarity of the electrical bond pads can change during operation, such that a given pad can be at a positive potential at one time and a negative potential at another time. The slider 302 shown in FIG. 3A utilizes eight electrical bond pads (P2-P9), it being understood that the number of electrical bond pads can vary depending on the particular slider design. For simplicity of explanation, only three electrical bond pads (P7-P9) and one ground pad (P1) are illustrated in FIG. 3A and other figures.

FIG. 3A shows an optical sensor 308 provided on a slider configured for heat-assisted magnetic recording in accordance with various embodiments. The optical sensor 308 includes a bolometer 310 and a reference sensor 312. The bolometer 310 and the reference sensor 312 are coupled in series. One end of the optical sensor 308 is coupled to a first bond pad, P7, and the other end of the optical sensor 308 is coupled to a second bond pad, P8. In the embodiment shown in FIG. 3A, the optical sensor 308 is coupled only to first and second bond pads P7 and P8, and to no other electrical bond pad or ground pad. The optical sensor 308 shown in FIG. 3A can be considered a dual-ended component which requires two electrical bond pads for proper operation. In contrast to a dual-ended component, a single-ended component is one which is coupled between a single electrical bond pad and a ground pad.

The bolometer 310 is disposed on the slider 302 at a location that receives at least some of the light produced by a laser source that propagates through an optical waveguide (see waveguide 222 in FIG. 2) of the slider 302. The propagating light impinges on an NFT 210 which is shown situated proximate to a writer 206. The slider 302 also includes a reader, which is not shown in FIG. 3A for simplicity of explanation. The bolometer 310 can be situated within cladding of the optical waveguide, for example, and preferably has negligible impact on optical efficiency (e.g., reduces optical efficiency by less than 5%). For example, the bolometer 310 can be situated within about 5 μm from a centerline of the core of the optical waveguide. The response of the bolometer 310 is based primarily on the light impinging on it from the optical waveguide and the ambient temperature at the location where the bolometer 310 is situated on the slider 302. The reference sensor 312 is situated at a location of the slider 302 unexposed to the light but exposed to the ambient temperature. The reference sensor 312 is situated in proximity to the bolometer 310, such that the ambient temperature of the reference sensor 312 is substantially the same as the ambient temperature of the bolometer 310 (e.g., to within 1-2%). For example, the reference sensor 312 can be situated to within about 10 to 15 μm from the bolometer 310. In this regard, the bolometer 310 and the reference sensor 312 are situated on the same isotherm 314.

The bolometer 310 and the reference sensor 312 are configured or otherwise operated so that a response of these two components to a change in ambient temperature is effectively canceled. For example, the bolometer 310 can be configured to have a positive change in signal output in response to a change in ambient temperature, and the reference sensor 312 can be configured to have a negative change in signal output in response to the change in ambient temperature. It is understood that either of the bolometer 310 and the reference sensor 312 can be configured to have a positive or negative change in signal output in response to a change in ambient temperature, as long as the two components produce output signals that can be combined in a manner that allows cancellation of the effect of temperature variation.

The bolometer 310 and the reference sensor 312 are preferably constructed so that they produce output signals of substantially the same magnitude. Because the bolometer 310 and the reference sensor 312 are subject to the same changes in ambient temperature, the response of the reference sensor 312 to a change in ambient temperature can be effectively subtracted from the response of the bolometer 310 to the same change in ambient temperature. Having canceled the common change to ambient temperature in the bolometer 310 and the reference sensor 312, the resulting output signal produced by the optical sensor 308 is representative predominantly of a change in output optical power of the laser source as sensed by the bolometer 310.

For purposes of explanation, the bolometer 310 and the reference sensor 312 can be modeled (and implemented) as resistors each having a temperature coefficient of resistance. For example, the bolometer 310 and the reference sensor 312 can each be a metal wire having a TCR fabricated into the slider 302. Suitable materials for fabricating the bolometer 310 and the reference sensor 312 include Cr, NiFe, Ni, and other materials that have high TCR. In some implementations, it may be desirable to fabricate the electrical conductors (e.g., traces or leads) that connect the bolometer 310 to the reference sensor 312 and the optical sensor 308 to the bond pads P7 and P8 from a material having a relatively low, or near zero, TCR. Suitable materials include NiCu alloys. Use of low or near zero TCR materials for the electrical conductors insures that nearly all temperature-related changes in the optical sensor 308 are due to temperature changes experienced by the bolometer 310 and the reference sensor 312, rather than by the electrical conductors coupled thereto.

A DC bias can be supplied to the optical sensor 308 to establish a potential difference between electrical bond pads P7 and P8. A constant current can be supplied to the optical sensor 308 via bond pads P7 and P8. In the following illustrative example, it is assumed that the bolometer 310 ($R_B$) and the reference sensor 312 ($R_A$) have the same TCR ($\alpha$) but of opposite sign. For example, $R_B$ has one of a positive and negative TCR, and $R_A$ has the other of the positive and negative TCR. For this representative example, the resistance versus temperature relationship can be modeled using the following equation:

$$R(T_1) = R(T_0)[1 + \alpha(T_1 - T_0)] \quad (1)$$

where $T_1$ and $T_0$ are temperatures, R(T) is the resistance at a given temperature T, and $\alpha$ is the temperature coefficient of resistance. It is noted that this equation is an approximation and is most accurate when $\alpha(T_1 - T_0) \ll 1$.

In the following illustrative example, a special case is considered in which the TCR of the two resistors, $R_A$ and $R_B$, in the circuit shown in FIG. 3A are identical in magnitude but of opposite sign, i.e. $\alpha_A = (-)\alpha_B$, and the initial resistance, R, of the two resistors is identical, i.e. $R_B(T_0) = R_A(T_0)$. Inserting these assumptions into Equation (1) above results in the following expressions for resistance:

$$R_A(T_1) = R_A(T_0)[1 + \alpha_A(T_1 - T_0)] \quad (2) \& (3)$$

$$R_B(T_1) = R_B(T_0)[1 - \alpha_A(T_1 - T_0)]$$

It can be seen that in the series combination, the total resistance does not change with temperature, $R_A(T_1) + R_B(T_1) = 2R_A(T_0) = R_A(T_0) + R_B(T_0)$. In the context of the circuit shown in FIG. 3A, the signals produced by the bolometer 310 and the reference sensor 312 in response to a common change in ambient temperature have substantially the same magnitude but are opposite in polarity, and thus cancel out. Any changes in resistance of the bolometer 310 relative to the reference sensor 312 are due to changes in output optical power of the laser source, and not due to changes in ambient temperature.

It is understood that implementing the bolometer 310 and the reference sensor 312 using materials having substantially the same values of TCR but of opposite sign simplifies the signal processing and circuitry. Moreover, implementing the bolometer 310 and the referent sensor 312 to have substantially the same size and shape (i.e., the same geometry), in addition to the same values of TCR (but opposite in sign), serves to produce components that generate output signals of equal magnitude in response to the same changes in temperature.

In some embodiments, some degree of imbalance between the bolometer 310 and the reference sensor 312 can exist, as long as the resistance and TCR magnitudes of the bolometer 310 and the reference sensor 312 are similar. The following illustrative example considers the effect of imbalance in one or both of initial resistance and TCR magnitude between the series-connected bolometer 310 and the reference sensor 312. In this scenario, the following equations apply:

$$\alpha_B = (-)\beta\alpha_A \qquad (4)$$

$$R_B(T_0) = \delta R_A(T_0) \qquad (5)$$

Equations (4) and (5) are correct in general, but it is assumed in this illustrative example that both $\beta$ and $\delta$ are nearly equal to unity. Inserting these assumptions for Equations (4) and (5) into Equation (1) above results in the following expressions for resistance:

$$R_A(T_1) = R_A(T_0)[1 + \alpha_A(T_1 - T_0)] \qquad (6) \& (7)$$

$$R_B(T_1) = \delta R_A(T_0)[1 - \beta\alpha_A(T_1 - T_0)]$$

$$R_A(T_1) + R_B(T_1) = R_A(T_0)[1 + \delta] + R_A(T_0)\alpha_A(T_1 - T_0)[1 - \beta] \qquad (8)$$

For the case of perfect matching of the reference and bolometer resistors (i.e. $\beta=\delta=1$), the previous results of complete insensitivity to temperature are obtained. On the other hand, when $\beta$ and/or $\delta$ differ from unity, errors are incurred. However, as long as $\beta$ and $\delta$ are both somewhat close to unity (e.g., between 0.8 and 1.2), much of the thermal background variation is canceled even if not perfectly so.

According to some embodiments, the optical sensor 308 is situated on the slider 302 away from ABS 215. More particularly, the optical sensor 308 is situated at a distance away from the heat-producing components at the ABS 215, including the NFT 210 and the writer 206. Situating the optical sensor 308 away from the heat-producing components at the ABS 215 reduces the number of heat sources that can impact the thermal environment surrounding the bolometer 310 and the reference sensor 312. However, it may be necessary to locate the optical sensor 308 at less than preferred locations of the slider 302 due to design layout constraints. As long as the bolometer 310 and the reference sensor 312 are located on the same isotherm, the optical sensor 308 may be implemented at any location of the slider 302.

Figure 3B:
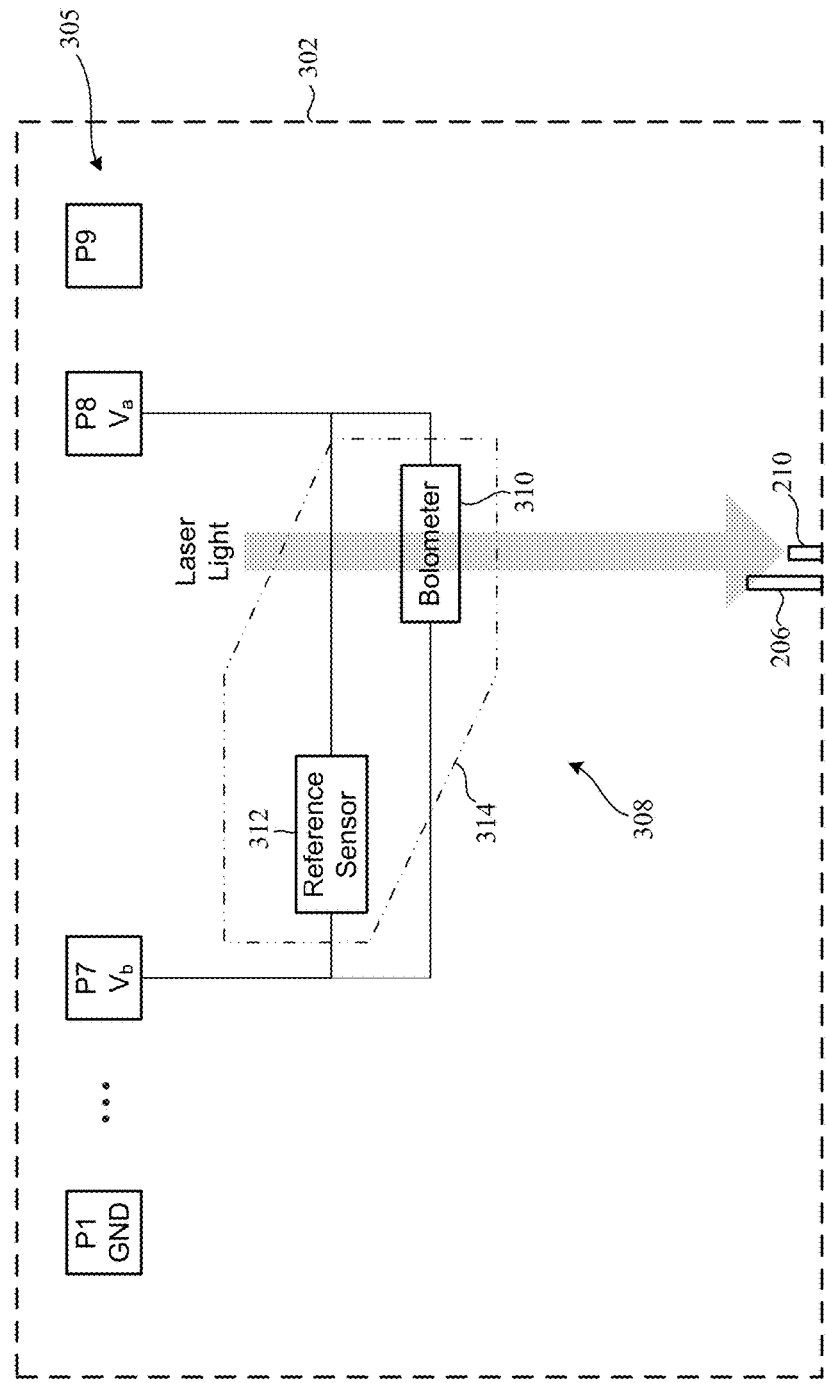
FIG. 3B is a diagram of an optical sensor configured for implementation on a slider in accordance with other embodiments.

FIG. 3B illustrates an optical sensor for incorporation in a slider configured for heat-assisted magnetic recording accordance with various embodiments. The optical sensor 308 shown in FIG. 3B includes a bolometer 310 and a reference sensor 312 as described in the embodiment of FIG. 3A. In FIG. 3B, the bolometer 310 and the reference sensor 312 are coupled in parallel between bond pads P7 and P8. Although the circuit configuration shown in FIG. 3B is somewhat more complex than that shown in FIG. 3A, the parallel-connected bolometer 310 and reference sensor 312 operate to produce a signal indicative of output optical power of a laser source with high fidelity (e.g., a signal not confounded by extraneous heat sources).

In the following simplified example, it is assumed that the bolometer 310 ($R_B$) and the reference sensor 312 ($R_A$) have the same TCR, $\alpha$, but are opposite in sign, i.e. $\alpha_A=(-)\alpha_B$ and the initial resistance, R, of the two resistors is identical, i.e. $R_B(T_0)=R_A(T_0)$. For the parallel combination shown in FIG. 3B, similar temperature insensitivity is found as demonstrated in the following equations:

$$R_A(T_1) \| R_B(T_1) = \frac{R_A(T_1)R_B(T_1)}{R_A(T_1) + R_B(T_1)} = \frac{(R_A(T_0)[1 + \alpha_A(T_1 - T_0)]) * (R_A(T_0)[1 - \alpha_A(T_1 - T_0)])}{R_A(T_0) + R_A(T_0)} \qquad (9)$$

$$\frac{R_A(T_0)R_A(T_0)[1 - (\alpha_A(T_1 - T_0))^2]}{2R_A(T_0)}$$

$$\approx \frac{R_A(T_0)R_A(T_0)}{R_A(T_0) + R_A(T_0)} = R_A(T_0)\|R_A(T_0) = R_A(T_0)\|R_B(T_0)$$

where the assumption $\alpha(T_1-T_0)\ll 1$ was invoked to obtain the last equation.

Figure 4:
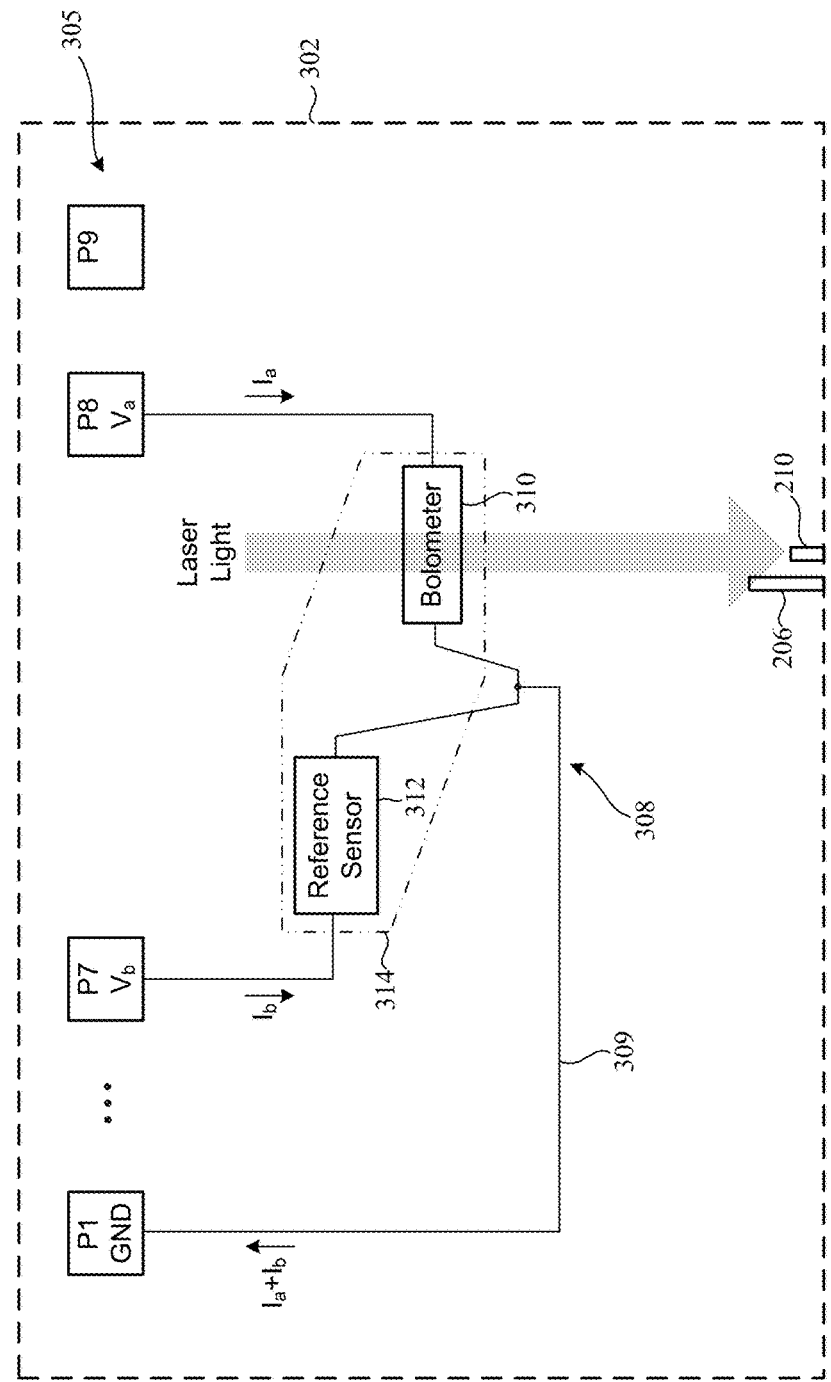
FIG. 4 is a diagram of an optical sensor configured for implementation on a slider in accordance with various embodiments.

FIG. 4 illustrates an optical sensor for incorporation in a slider configured for heat-assisted magnetic recording in accordance with various embodiments. The optical sensor 308 shown in FIG. 4 includes a bolometer 310 coupled in series to a reference sensor 312. The bolometer 310 and the reference sensor 312 are situated on the slider 302 at locations that share substantially the same ambient temperature (e.g., located on the same isotherm). One end of the optical sensor 308 is coupled to a first bond pad, P7, while the other end of the optical sensor 308 is coupled to a second bond pad, P8. In the embodiment shown in FIG. 4, a conductor 309 is coupled to the return bond pad, P1, and to a connection between the bolometer 310 and the reference sensor 312. Although the optical sensor 308 shown in FIG. 4 requires only two electrical bond pads (e.g., P7 and P8), the optical sensor 308 of FIG. 4 is also tied to a return or ground bond pad (e.g., P1).

According to various embodiments, the bolometer 310 and the reference signal 312 are constructed from the same material and have substantially the same geometry (i.e., size and shape). In the embodiment shown in FIG. 4, the bolometer 310 and the reference sensor 312 are constructed from a material having the same TCR sign (i.e., both positive or both negative). Constant current is applied to each of the bolometer 310 and the reference sensor 312 via bond pads P8 and P7, respectively. In the case of the bolometer 310 and reference sensor 312 being constructed of the same material and having the same geometry, it can be seen that the bias currents $I_A$ (through the bolometer 310) and $I_B$ (through the reference sensor 312) are equal. It is readily apparent that common changes in temperature of the bolometer 310 and the reference sensor 312 produce a negligible signal, $V_{sig}$, between the bond pads P7 and P8. As such, the signal, $V_{sig}$, detected at the bond pads P7 and P8 is predominately (e.g., solely) representative of changes in temperature experienced by the bolometer 310 due to changes in output optical power of the laser source, and not due to changes in ambient temperature.

It is noted that a differential amplifier can be coupled to bond pads P7 and P8 for purposes of detecting signals produced by the optical sensor 308. A logic device or processor, for example, can be coupled to the differential amplifier and configured to determine the magnitude of the detected changes in output optical power of the laser source.

The logic device or processor can further be configured to adjust current supplied to the laser source in response to the detected changes in output optical power sensed by the optical sensor 308 (e.g., to avoid mode hopping).

Figure 5:
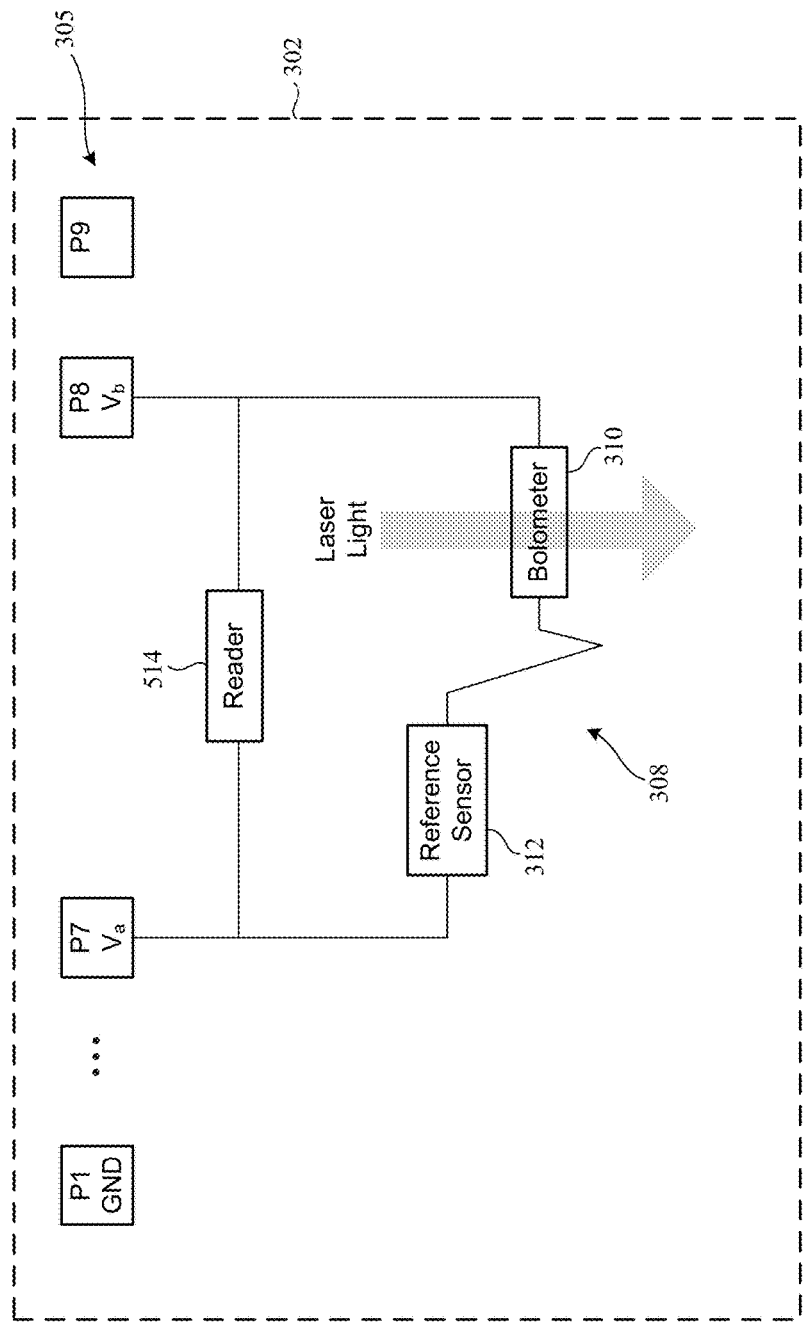
FIG. 5 is a diagram of bond pad sharing between an optical sensor and a reader in accordance with some embodiments.

FIGS. 5-8 illustrate various circuits involving bond pad sharing between an optical sensor 308 and one or more other electrical components of the slider 302 in accordance with various embodiments. As was discussed previously, the additional electrical and optical components of a HAMR slider place a greater demand on the available electrical bond pads of the slider. Although appearing to be a simple solution, adding additional bond pads to the slider is both costly and complex, requiring significant modifications to the wafer design and fabrication processes. FIG. 5 illustrates an optical sensor 308 of a type previously described coupled to a pair of bond pads, P7 and P8, in parallel with a reader 514 in accordance with some embodiments.

During a read operation, the reader 514 is active and the optical sensor 308 is generally inactive. Because the laser diode is generally inactive during a read operation, the reference sensor 312 and the bolometer 310 are relatively quiescent. A readback signal produced by the reader 514 during read operations can be sensed across bond pads P7 and P8 with little to no signal contribution from the optical sensor 308. During a write operation, the reader 514 is inactive and the optical sensor 308 is active. The signals produced by the optical sensor 308 during write operations can be sensed across bond pads P7 and P8 with little to no signal contribution from the reader 514, which remains relatively quiescent during write operations.

Figure 6:
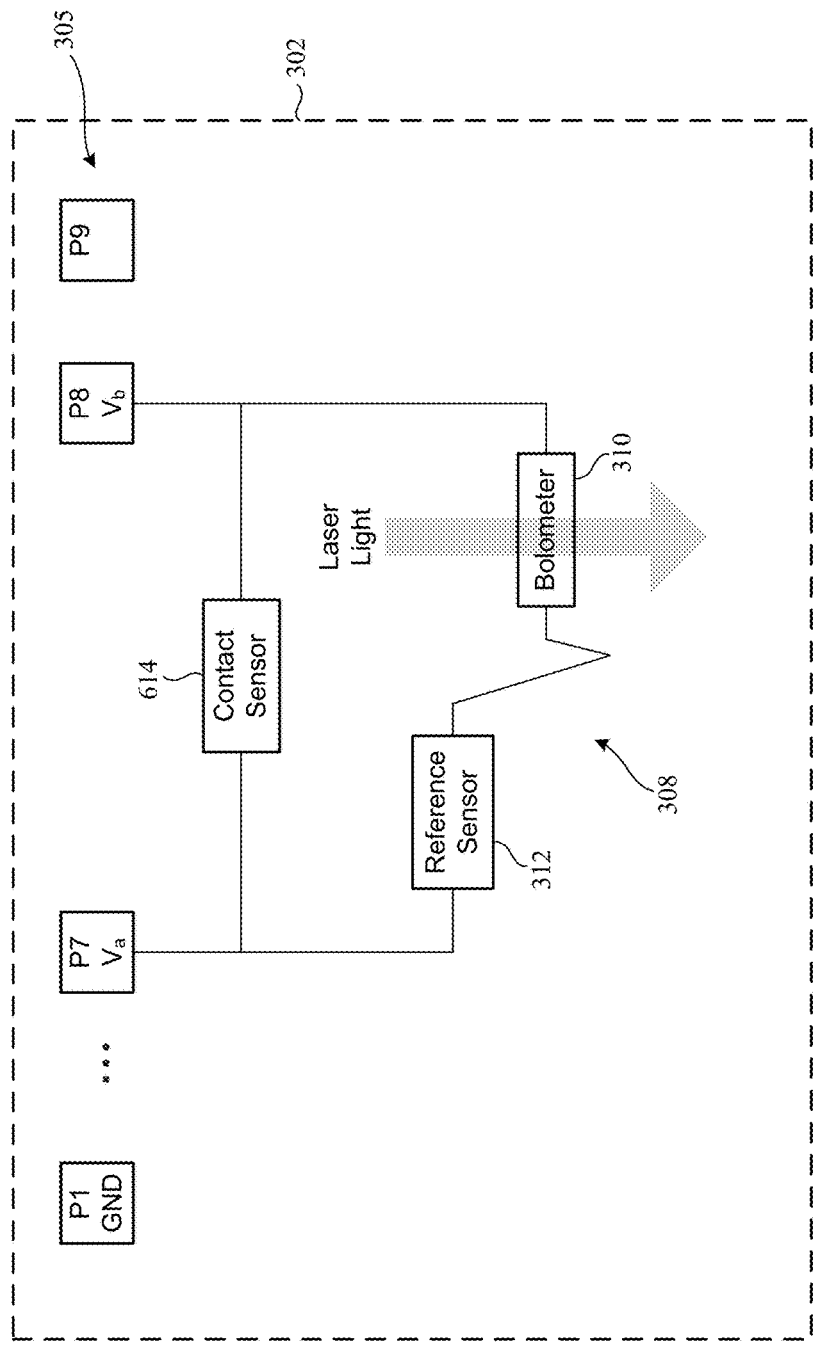
FIG. 6 is a diagram of bond pad sharing between an optical sensor and a contact sensor in accordance with some embodiments.

FIG. 6 illustrates an optical sensor 308 of a type previously described coupled to a pair of bond pads, P7 and P8, in parallel with a contact sensor 614 in accordance with various embodiments. In some embodiments, the contact sensor 614 is implemented as a wire having a high TCR. The contact sensor 614 may alternatively be implemented using a thermocouple, for example. The contact sensor 614 can be used for setting clearance, determining fly height, and detecting asperities, voids, and other topographical features of a magnetic recording medium. The contact sensor 614 can be implemented at a close point of the slider at or near the ABS, such as proximate the writer or the reader, for example.

According to some embodiments, during a contact detection operation (e.g., clearance testing), DC bias power is supplied to contact sensor 614 via bond pads P7 and P8 and to a heater (via another bond pad) in proximity to the contact sensor 614 to raise the surface temperature of the contact sensor 614 to be substantially higher than the temperature of the magnetic recording medium. As such, the recording medium acts as a heat sink in this scenario. When the slider contacts the medium, the slider surface temperature will drop due to a change in heat transfer rate resulting from the contact. The slider surface temperature will then increase due to heating from the heater and frictional heating. The abrupt drop in temperature or excursion in temperature trajectory of the contact sensor signal can be used to detect head-to-medium contact.

Operations involving the contact sensor 614 can be implemented at times when the optical sensor 308 is not active (e.g., at times other than during write operations). During active use of the contact sensor 614, the optical sensor 308 remains quiescent, contributing little or no signal to the output signal sensed at the bond pads P7 and P8. During use of the optical sensor 308 (e.g., during a write operation), the contact sensor 614 is inactive and remains quiescent. The signals produced by the optical sensor 308 during inactivity of the contact sensor 614 can be sensed across bond pads P7 and P8 with little to no signal contribution from the contact sensor 614.

Figure 7:
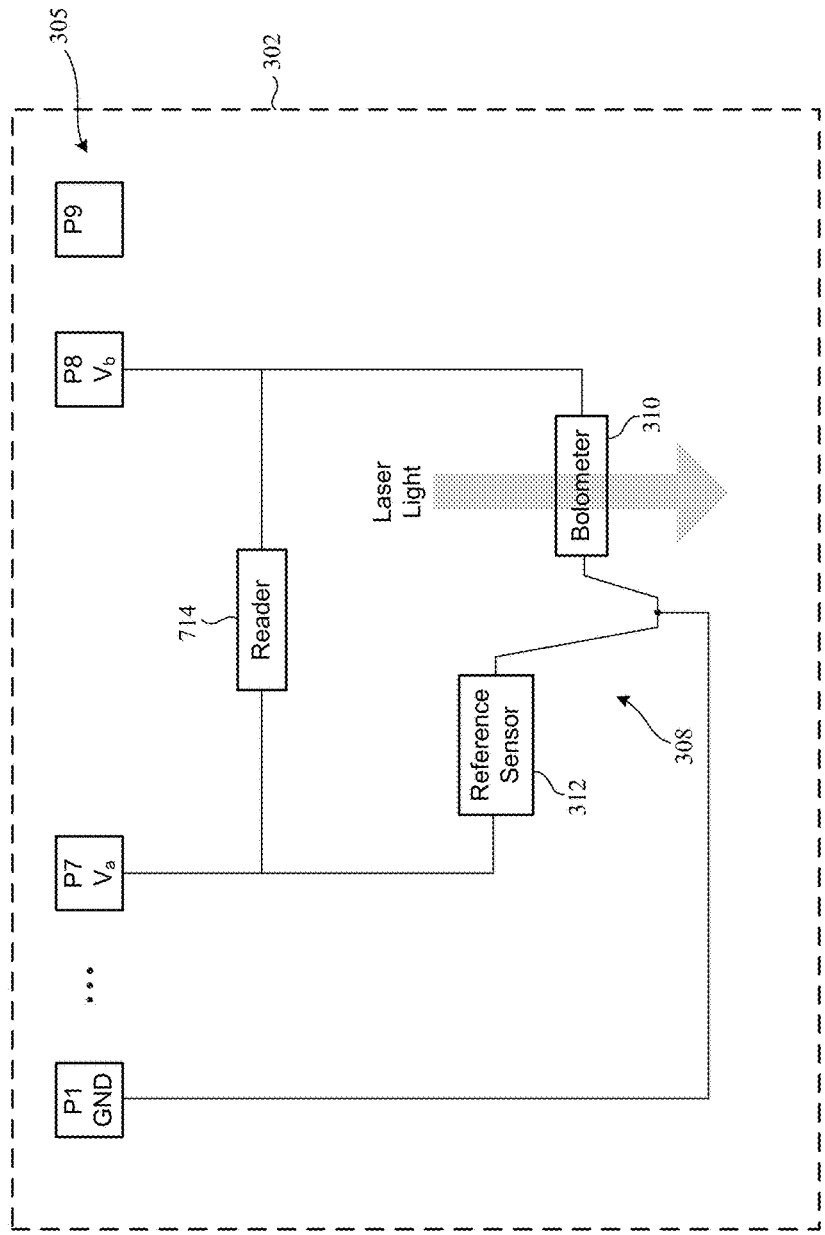
FIG. 7 is a diagram of bond pad sharing between an optical sensor and a reader in accordance with other embodiments.
Figure 8:
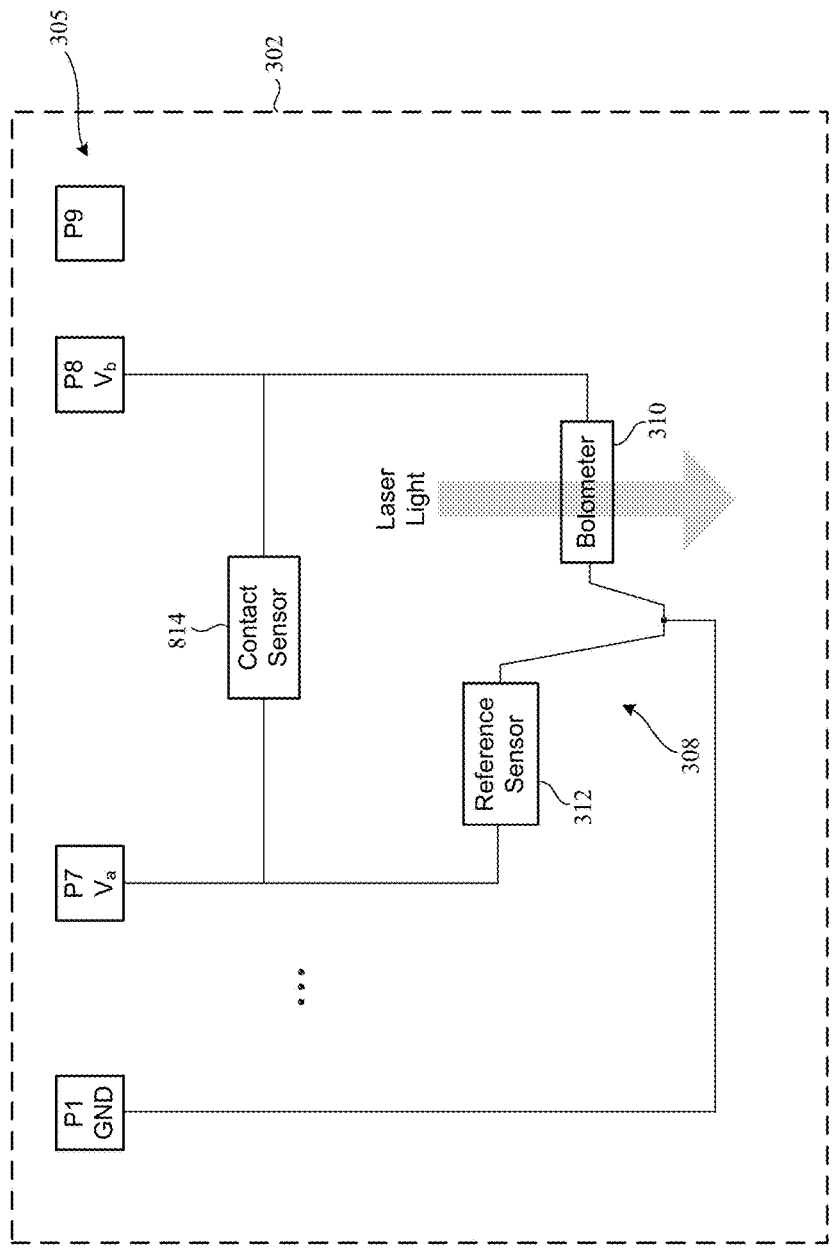
FIG. 8 is a diagram of bond pad sharing between an optical sensor and a contact sensor in accordance with further embodiments.

FIG. 7 shows the embodiment of FIG. 4 configured for bond pad sharing between an optical sensor 308 and a reader 714. The description of bond pad sharing provided hereinabove with reference to FIG. 5 is applicable to the embodiment shown in FIG. 7. FIG. 8 shows the embodiment of FIG. 6 configured for bond pad sharing between an optical sensor 308 and a contact sensor 814. The description of bond pad sharing provided hereinabove with reference to FIG. 6 is applicable to the embodiment shown in FIG. 8.

Figure 9:
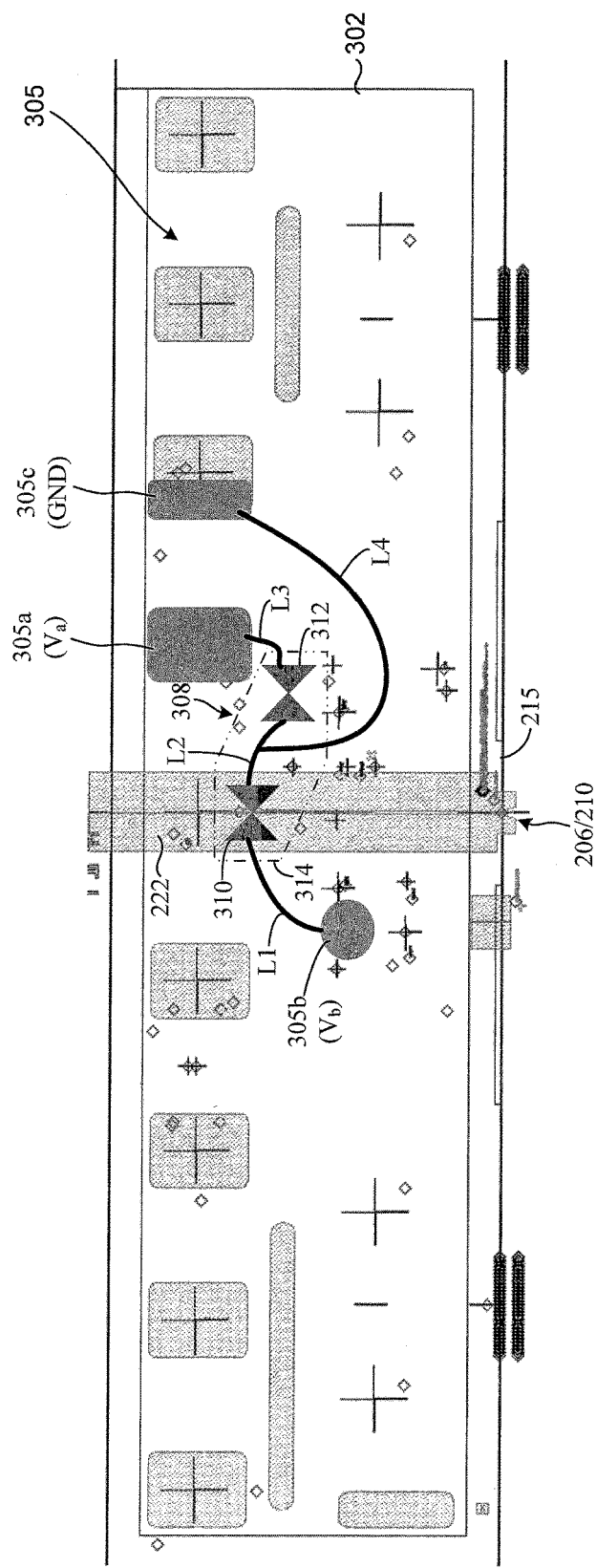
FIG. 9 is a wafer view of an optical sensor configured for implementation on a slider in accordance with some embodiments.

FIG. 9 is a wafer view of an optical sensor 308 implemented in a heat-assisted magnetic recording slider 302 in accordance with various embodiments. The wafer view of FIG. 9 shows different levels of the slider 302 using transparent elements (a first wafer level) and solid elements (a second wafer level). A set 305 of the bond pads and an optical waveguide 222 are shown on the first wafer level. At the ABS 215, an NFT 210 and a writer 206 are situated (occupying several wafer layers). A bolometer 310 and a reference sensor 312 of the optical sensor 308 are shown on the second wafer level, as is a conductor L2 which connects the bolometer 310 and the reference sensor 312 in series. The bolometer 310 is coupled to a terminal 305b ($V_b$) which, together with terminal 305a ($V_a$), biases the optical sensor 308 via conductor L1. The terminals 305a and 305b are contact points for two of the electrical bond pads shown on the first wafer level but expressed on the second wafer level.

The reference sensor 312 is coupled to terminal 305a via a conductor L3. A conductor L4 is coupled between a ground terminal 305c and a connection point between the bolometer 310 and the reference sensor 312. The wafer view of the slider 302 shown in FIG. 9 is representative of the optical sensor implementation shown in FIG. 4. It is understood that a similar wafer level schematic can be developed for the optical sensor implementation shown in FIG. 3.

Figure 10:
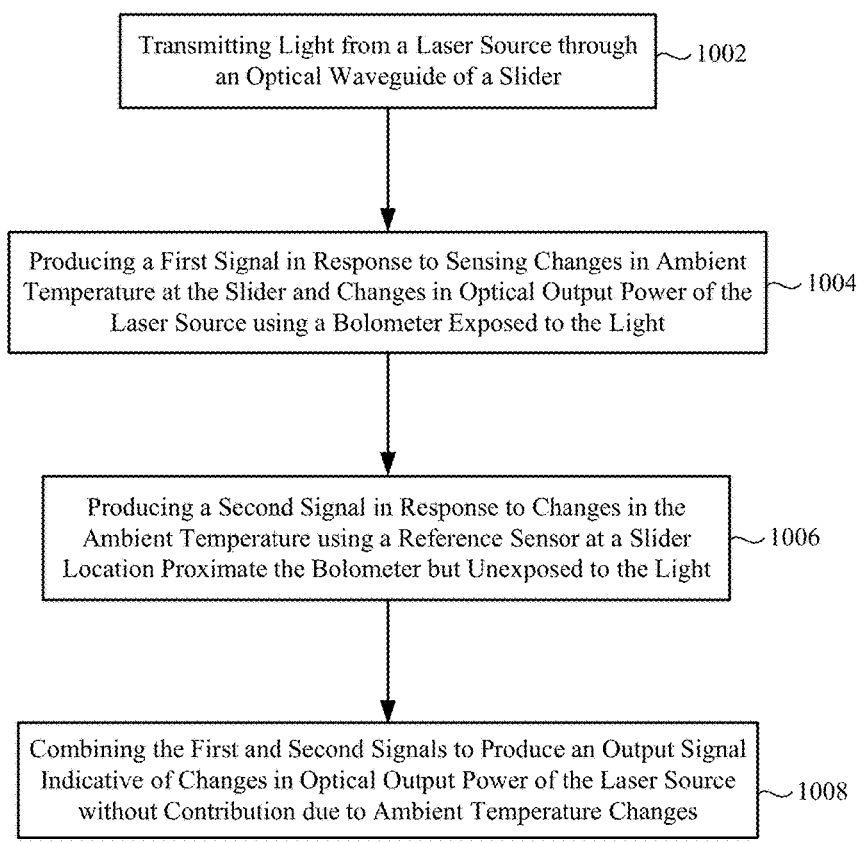
FIG. 10 is a flow chart showing various processes for sensing changes in optical output power of the laser source in accordance with various embodiments.

FIG. 10 is a flow chart showing various processes for sensing changes in optical output power of the laser source in accordance with various embodiments. The method shown in FIG. 10 involves transmitting 1002 light from a laser source through an optical waveguide of a slider. The method also involves producing 1004 a first signal in response to sensing changes in an ambient temperature at the slider and changes in optical output power of the laser source using a bolometer exposed to the light. The method further involves producing 1006 a second signal in response to sensing changes in the ambient temperature using a reference sensor at a slider location proximate the bolometer but unexposed to the light. The method also involves combining 1008 the first and second signals to produce an output signal. The output signal is indicative of changes in optical output power of the laser source without contribution due the ambient temperature changes.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof

What is claimed is:

1. An apparatus, comprising:
   a slider comprising a plurality of electrical bond pads including a first bond pad, a second bond pad, and a return bond pad;
   a writer and a reader on the slider;
   an optical waveguide of the slider configured to receive light from a laser source;
   a near-field transducer (NFT) on the slider and optically coupled to the waveguide;
   a contact sensor coupled to the first and second bond pads; and
   an optical sensor coupled to the first and second bond pads and in parallel with the contact sensor, the optical sensor comprising:
      a bolometer situated at a location of the slider that receives at least some of the light and exposed to an ambient temperature at the slider;
      a reference sensor situated at a location of the slider unexposed to the light and exposed to the ambient temperature; and
      a conductor coupled to the return bond pad and a connection between the bolometer and the reference sensor.

2. The apparatus of claim 1, wherein:
   the contact sensor is active when the optical sensor is inactive; and
   the contact sensor is inactive when the optical sensor is active.

3. The apparatus of claim 1, wherein:
   when the contact sensor is active, a first signal produced by the contact sensor is sensed at the first and second bond pads and the optical sensor is quiescent and contributes little or no signal to the first signal; and
   when the optical sensor is active, a second signal produced by the optical sensor is sensed at the first and second bond pads and the contact sensor is quiescent and contributes little or no signal to the second signal.

4. The apparatus of claim 1, wherein:
   the contact sensor is configured to produce a first signal indicative of one or more of temperature, head-medium spacing changes, and head-medium contact; and
   the optical sensor is configured to generate a second signal indicative of changes in output optical power of the laser source.

5. The apparatus of claim 1, wherein:
   the bolometer is configured to produce a first signal in response to a change in the ambient temperature and a change in the output optical power;
   the reference sensor is configured to produce a second signal in response to the change in the ambient temperature; and
   the optical sensor is configured to produce a combined signal using the first and second signals, the combined signal indicative of changes in optical output power of the laser source without contribution due the ambient temperature changes.

6. The apparatus of claim 1, wherein the reference sensor is coupled in series with the bolometer.

7. The apparatus of claim 1, wherein signals produced by the bolometer and the reference sensor are of substantially equal magnitude in response to the ambient temperature change.

8. The apparatus of claim 1, wherein the bolometer and the reference sensor are situated on the same isotherm of the slider.

9. The apparatus of claim 1, wherein the bolometer and the reference sensor are substantially equivalent in composition, size, and shape.

10. The apparatus of claim 1, wherein the bolometer and the reference sensor differ in one or more of composition, size, and shape.

11. The apparatus of claim 1, wherein the bolometer and the reference sensor have substantially the same temperature coefficient of resistance.

12. An apparatus, comprising:
    a slider configured to facilitate heat-assisted magnetic recording and comprising a light source and a plurality of electrical bond pads including a first bond pad, a second bond pad, and a return bond pad;
    a contact sensor disposed on the slider and coupled to the first and second bond pads; and
    an optical sensor disposed on the slider and coupled to the first and second bond pads and in parallel with the contact sensor, the optical sensor comprising:
       a bolometer;
       a reference sensor coupled in series with the bolometer; and
       a conductor coupled to the return bond pad and a connection between the bolometer and the reference sensor.

13. The apparatus of claim 12, wherein:
    the contact sensor is active when the optical sensor is inactive; and
    the contact sensor is inactive when the optical sensor is active.

14. The apparatus of claim 12, wherein:
    when the contact sensor is active, a first signal produced by the contact sensor is sensed at the first and second bond pads and the optical sensor is quiescent and contributes little or no signal to the first signal; and
    when the optical sensor is active, a second signal produced by the optical sensor is sensed at the first and second bond pads and the contact sensor is quiescent and contributes little or no signal to the second signal.

15. The apparatus of claim 12, wherein:
    the contact sensor is configured to produce a first signal indicative of one or more of temperature, head-medium spacing changes, and head-medium contact; and
    the optical sensor is configured to generate a second signal indicative of changes in output optical power of the laser source.

16. The apparatus of claim 12, wherein:
    the bolometer is configured to produce a first signal in response to a change in an ambient temperature and a change in output optical power of the light source;
    the reference sensor is configured to produce a second signal in response to the change in the ambient temperature; and
    the optical sensor is configured to produce a combined signal using the first and second signals, the combined signal indicative of changes in optical output power of the light source without contribution due the ambient temperature changes.

17. The apparatus of claim 12, wherein signals produced by the bolometer and the reference sensor are of substantially equal magnitude in response to the ambient temperature change.

18. The apparatus of claim 12, wherein the bolometer and the reference sensor are situated on the same isotherm of the slider.

19. A method, comprising:
   transmitting light from a laser source through an optical waveguide of a slider;
   producing, by a contact sensor of the slider, a first signal indicative of one or more of temperature, head-medium spacing changes, and head-medium contact;
   producing, using a bolometer of the slider and exposed to the light, a second signal in response to sensing changes in an ambient temperature at the slider and changes in optical output power of the laser source;
   producing, using a reference sensor at a slider location proximate the bolometer but unexposed to the light, a third signal in response to sensing changes in the ambient temperature; and
   combining the second and third signals to produce an output signal, the output signal indicative of changes in optical output power of the laser source without contribution due the ambient temperature changes.

20. The method of claim 19, wherein:
   the contact sensor is active when the bolometer and reference sensor are inactive; and
   the contact sensor is inactive when the bolometer and reference sensor are active.

* * * * *